United States Patent
Sathyanarayana

(10) Patent No.: US 7,502,525 B2
(45) Date of Patent: Mar. 10, 2009

(54) SYSTEM AND METHOD FOR EDGE DETECTION OF AN IMAGE

(75) Inventor: Shashidhar Sathyanarayana, Union City, CA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 642 days.

(21) Appl. No.: 10/352,384

(22) Filed: Jan. 27, 2003

(65) Prior Publication Data

US 2004/0146201 A1 Jul. 29, 2004

(51) Int. Cl.
G06K 9/40 (2006.01)
(52) U.S. Cl. ........................ 382/266; 382/360
(58) Field of Classification Search ............ 382/200
See application file for complete search history.

(56) References Cited

U.S. PATENT DOCUMENTS

| | | | | |
|---|---|---|---|---|
| 3,597,732 A | * | 8/1971 | Morimoto | 382/200 |
| 5,343,390 A | * | 8/1994 | Doi et al. | 382/132 |
| 5,845,007 A | | 12/1998 | Ohashi et al. | 382/199 |
| 5,875,040 A | | 2/1999 | Matraszek et al. | 358/453 |
| 5,881,171 A | | 3/1999 | Kinjo | 382/199 |
| 6,021,222 A | | 2/2000 | Yamagata | 382/199 |
| 6,094,508 A | | 7/2000 | Acharya et al. | 382/199 |
| 6,173,083 B1 | | 1/2001 | Avinash | 382/260 |
| 6,208,763 B1 | | 3/2001 | Avinash | 382/254 |
| 6,229,578 B1 | * | 5/2001 | Acharya et al. | 348/607 |
| 6,337,925 B1 | * | 1/2002 | Cohen et al. | 382/199 |
| 6,404,936 B1 | | 6/2002 | Katayama et al. | 382/283 |
| 6,415,053 B1 | | 7/2002 | Norimatsu | 382/199 |
| 6,421,469 B1 | | 7/2002 | Nelson et al. | 382/274 |
| 6,449,391 B1 | | 9/2002 | Ku | 382/194 |
| 6,453,069 B1 | | 9/2002 | Matsugu et al. | 382/173 |
| 6,498,660 B2 | | 12/2002 | Haltmaier | 358/2.1 |
| 6,707,937 B1 | * | 3/2004 | Sobel et al. | 382/162 |
| 2002/0131639 A1 | * | 9/2002 | Prakash et al. | 382/199 |
| 2003/0218621 A1 | * | 11/2003 | Jiang | 345/698 |

OTHER PUBLICATIONS

Stefan Will, On Learning Texture Edge Detectors, published 2000, IEEE.*

* cited by examiner

*Primary Examiner*—Matthew C. Bella
*Assistant Examiner*—Alex Liew
(74) *Attorney, Agent, or Firm*—Darby & Darby P.C.; Bruce E. Black

(57) ABSTRACT

The improved system and method detects edges in an image defined by a data set. In one aspect, a plurality of arrays of pattern recognition classifiers are populated throughout an image. Each array may yield a value which indicates whether or not the array is on or near an edge to be detected. The edge may be interpolated between the arrays that are on or near an edge to be detected or extrapolated after an array on or near the edge. This edge detection method may result in more accurate edge detection.

16 Claims, 3 Drawing Sheets

SYSTEM AND METHOD FOR EDGE DETECTION OF AN IMAGE

FIELD OF THE INVENTION

The field of the invention relates to image interpretation technology, and more particularly to an improved system and method for edge detection of an image.

BACKGROUND OF THE INVENTION

A fundamental step in image interpretation is edge detection. The goal of edge detection is to identify the pixels in the image that correspond to the edges of objects perceived. Here, we use the term image to include more general data sets. An example of an image 1 having an edge 2 is shown on FIG. 1. The image may be from any source, including but not limited to a medical ultrasound imaging device, a light-based imaging device such as Optical Coherence Tomography (OCT) and Optical Coherence Domain Reflectography (OCDR) imaging devices, and magnetic resonance imaging (MRI).

A common approach to edge detection is to find pixels which locally maximize the gradient magnitude in the gradient direction. Standard edge detectors known in the art, such as the Sobel and Prewitt detectors, are finite-difference-based first-derivative operators that pick up high-frequency responses at image edges. Another detector known in the art is the Canny detector, which formulates edge detection as an optimization problem. These and related techniques have been used with varying success. However, there remains the unsolved problem of quality edge detection with many real-world images in which edges are more appropriately characterized by textural differences rather than differences in intensity. One example of these types of edges is an edge defined in a physiological image, such as an ultrasound image.

In such images, edges are not necessarily associated with sharp changes in image values. This lack of association stems at least from three causes. First, objects may not have a strong contrast with their backgrounds. Second, objects are often covered with texture or markings that generate edges of their own, so much so that it is often impractical or impossible to sort out the relevant pieces of the object boundary. Finally, artifacts such as shadows may generate edges that have no relation to object boundaries.

The inadequacy of traditional edge detection methods when applied to these types of images is well known. Accordingly, an improved edge detection method would be desirable.

BRIEF DESCRIPTION OF THE DRAWINGS

In order to better appreciate how the above-recited and other advantages and objects of the inventions are obtained, a more particular description of the inventions briefly described above will be rendered by reference to examples of specific embodiments, which are illustrated in the accompanying drawings, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely. Understanding that these drawings depict only example embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Described below is a new system and method for detecting an edge within an image. The image may be from any source, including but not limited to a medical ultrasound imaging device, a light-based imaging device such as Optical Coherence Tomography (OCT) and Optical Coherence Domain Reflectography (OCDR) imaging devices, and magnetic resonance imaging (MRI).

Figure 1:
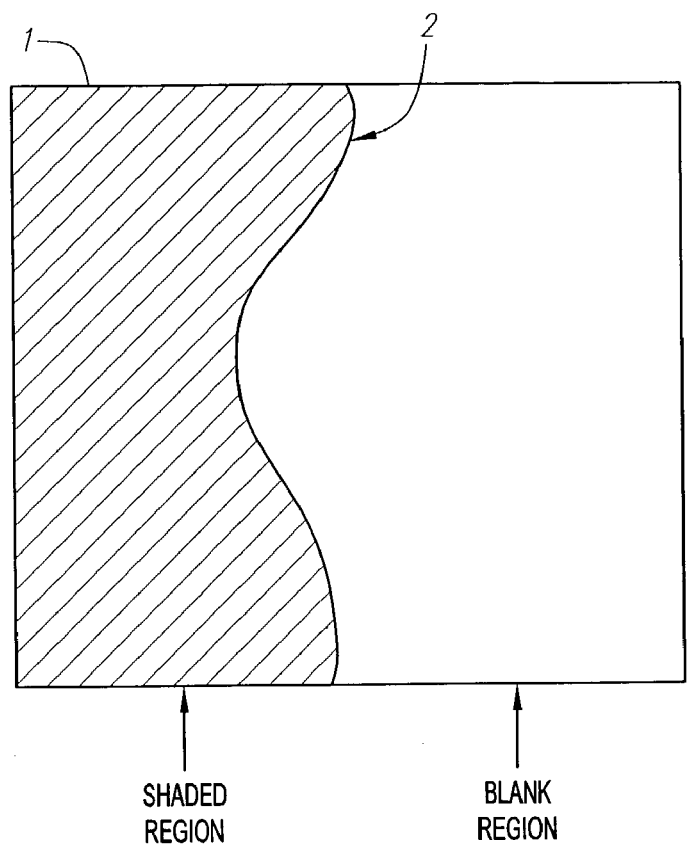
FIG. 1 is an illustration of an image having an edge defined within the image.

An image may be represented by a data set of addressable units, e.g., pixels of a display screen. Each addressable unit includes a value that may represent a particular color or shade, and the image, such as the one shown in FIG. 1, is made up of these addressable units put together.

Figure 2:
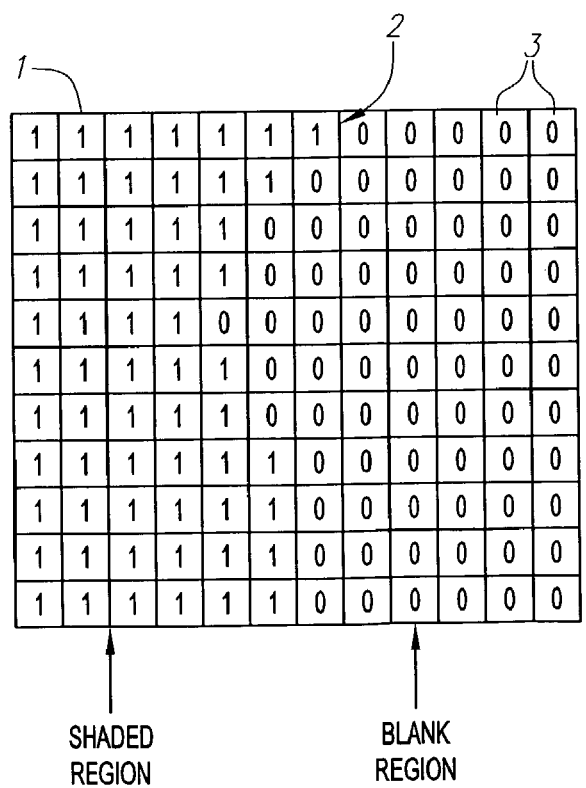
FIG. 2 is an illustration of a data set representing the image in FIG. 1.

An example of an image represented by addressable units is shown in FIG. 2. In this example, the image 1 in FIG. 1 is represented by 132 addressable units 3. The image 1 has two regions, shaded and blank. The shaded region is represented by 1's, and the blank region is represented by 0's. The edge 2 of the image 1 is defined by the interface between the blank region and the shaded region. In this example, an addressable unit 3 has only one bit, which could be either 1 or 0. However, an image could be represented by any number of addressable units, and each addressable unit could have any number of bits.

Figure 3:
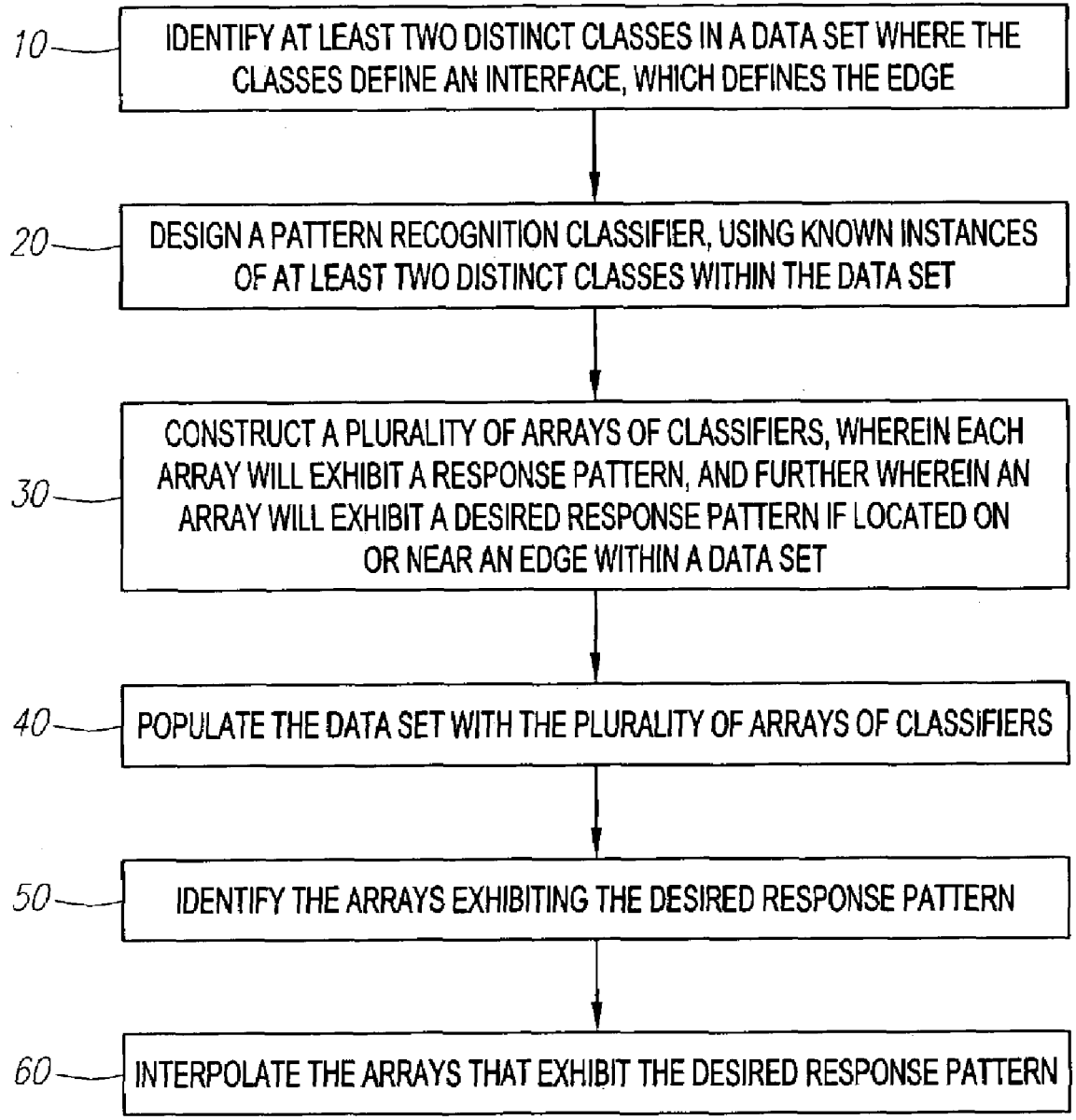
FIG. 3 is a flowchart of a preferred embodiment of an improved method for edge detection.

One example approach to detect an edge in an image represented by a data set of addressable units, or pixels, is illustrated in FIG. 3. An edge within an image is generally defined by the interface between at least two distinct regions, or classes. For example, turning to FIG. 4, another sample image 100 is shown. The image 100 has to distinct regions, shaded and blank, and the interface between the shaded and blank regions defines an edge 200. Turning back to FIG. 3, one of the initial steps to detect an edge is to identify the different classes, within the data set or image 100, that are interfaced together to define an edge 200 (block 10). The next step is to design a pattern recognition classifier, which is a component that can recognize to which class a particular portion of the image 100 belongs (block 20). When designing a pattern recognition classifier, it is helpful to use known instances of the different classes within the image 100 or data set. For example, in FIG. 4, a known instance of a shaded region would be somewhere on the left side of the image 100, and a known instance of a blank region would be somewhere on the right side of the image 100.

Figure 4:
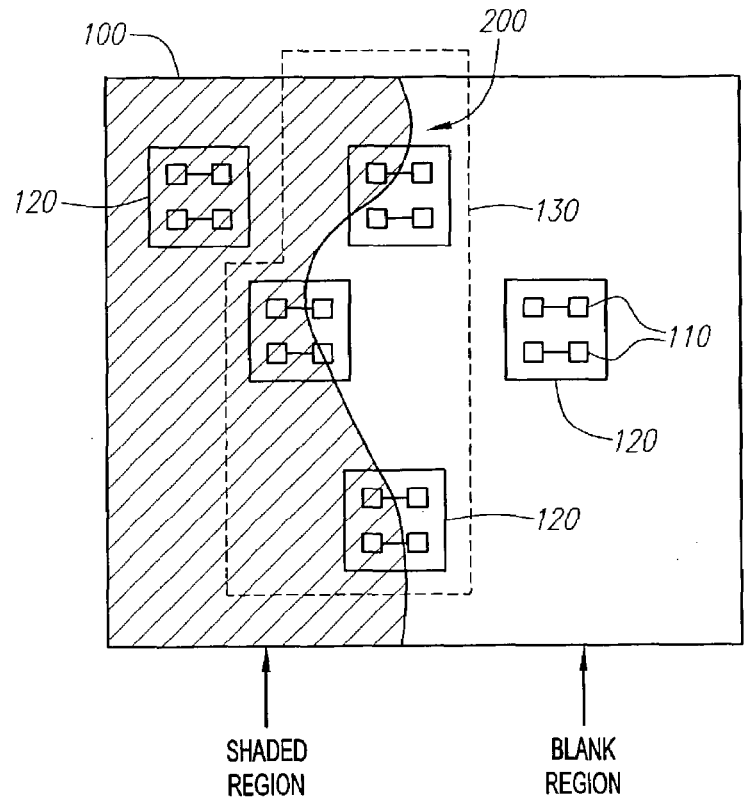
FIG. 4 is an illustration of a preferred embodiment of an improved method for edge detection as applied to an image having an edge.
Figure 5:
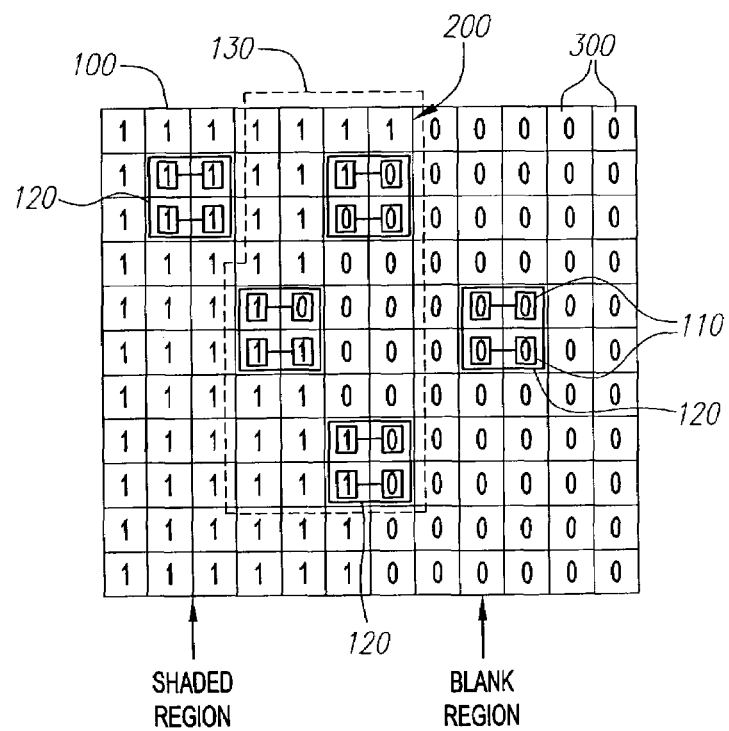
FIG. 5 is an illustration of a preferred embodiment of an improved method for edge detection as applied to a data set representing the image in FIG. 4.

A pattern recognition classifier may be assigned to, or placed over, a particular area of the image, and, using a particular algorithm, the pattern recognition classifier may determine to which class or region the particular area belongs. An example of a pattern recognition classifier 110 placed over a particular region of an image 100 is shown in FIG. 4. The image 100 in FIG. 4 is represented in FIG. 5 by a data set of addressable units 300, or pixels, each having one bit which could have a value of 1 or 0. Each 0 represents a portion of the blank region, and each 1 represents a portion of the shaded region. In this example, a pattern recognition classifier 110 is assigned to an addressable unit, and thus, if a classifier 110 is placed over a portion of the blank region, it would yield a 0, and if a classifier 110 is placed over a portion of a shaded region, it would yield a 1.

The example in FIGS. 4 and 5 illustrates a simplified form of an example embodiment of the improved method. In a preferred embodiment, an addressable unit has more than one bit, preferably at least 8 bits, i.e., at least 256 different values, so that an addressable unit could represent at least, for example, 256 different colors. Further, in a preferred embodiment, a pattern recognition classifier could be assigned to, or placed over, a plurality of addressable units. To determine the class of a plurality of addressable units, the classifier may yield a feature vector as a value instead of an absolute value. A feature vector is obtained by extracting the local image mean, i.e., the average mean of the values of the addressable units, and the variance from the local mean, i.e., how much variance are the values of the addressable units from the local mean. Existing pattern recognition techniques known in the art may be incorporated into the classifier's algorithm to determined to which class the classifier belongs based on the feature vector. One preferred technique is the Bayesian Classification technique.

Turning back to FIG. 3, a plurality of pattern recognition classifiers may be grouped together in an array, in a predetermined arrangement. Each array will preferably exhibit a response pattern and will exhibit a particular response pattern if the array is located on or near an edge of an image (block 30). A plurality of these arrays may then be located, assigned to, or placed over, various areas of the image or data set, preferably on or near an edge (block 40). Turning back to FIGS. 4 and 5, a plurality of example arrays 120 are located over various areas of the image 100. Each of the example arrays 120 has four pattern recognition classifiers 110 arranged in a square. In a preferred embodiment, an array may include at least eight classifiers. Of course, the arrays 120 could have any number of pattern recognition classifiers 110 and can have the pattern recognition classifiers 110 arranged in a shape besides a square. Whether an array is located on or near an edge depends upon the values of the classifiers within the array, and whether they yield a particular response pattern. For example, in FIGS. 4 and 5, if an array 120 has its two classifiers 110 on the left side yielding at least one 1 and its two classifiers 110 on the right side yielding at least one 0, such as the array 120 closest to the bottom of the image 100, then that array 100 is more probably located on or near an edge. As can be appreciated by one of ordinary skill in the art, the particular response pattern could be a variety of patterns depending upon factors such as type of image, complexity of the image, the number of distinct classes or regions identified, the type of value produced by the classifiers, etc.

Turning back to FIG. 3, the next step is to identify the arrays that exhibit the particular response pattern (block 50). In other words, in the example of FIGS. 4 and 5, the array 120 nearest the bottom of the image 100 (which has two classifiers 110 on the left side yielding 1's and two classifiers 110 on the right side yielding 0's) exhibits a particular response pattern indicating that the array 120 is more probably located on or near an edge. In other words, if the number of pattern recognition classifiers lying on one side of the edge is approximately equal to the number of pattern recognition classifiers lying on the other side of the edge, one may consider the array as lying on or near an edge. Other particular response patterns may be used, of course. For example, one may identify arrays whose predetermined response pattern indicate that the number of pattern recognition classifiers lying on or substantially close to the edge exceeds a threshold. After identifying arrays whose predetermined response pattern indicate that the array is located on or near an edge, the arrays that exhibit the particular response pattern may be interpolated, e.g., a smooth curve may be drawn passing through the centers of the arrays that exhibit the particular response pattern (block 60), and/or extrapolated to other parts of the image 100.

For example, turning back to FIGS. 4 and 5, the arrays 120 that exhibit the particular response pattern are the arrays 130 located down the center of the image 100. A smooth curve may be drawn through the centers of those arrays 130. As can be appreciated by one of ordinary skill in the art, using the method described above on an image with a higher resolution, i.e., with a higher number of addressable units having a higher number of possible values, and using a higher number of arrays, will provide higher edge detection accuracy.

Non-ideal pattern recognition classifiers, e.g., classifiers with approximately 75% accuracy, may be used to achieve near-ideal edge detection accuracy, e.g., approximately 95% using arrays with at least 8 classifiers. Further, these arrays of pattern recognition classifiers may lend themselves to computationally efficient edge detection solutions for a number of reasons, which may include: (a) arrays need not be placed over the entire image, (b) a priori information on the location of the edges may be used in a simple way, and (c) computations pertaining to a particular pattern recognition classifier array in an image may at any time be abandoned if an early determination is made that the particular pattern recognition classifier array is unlikely to be located on or near the edge or if an early determination is made that the particular array cannot determine if it is on or near the edge.

Although particular embodiments of the inventions have been shown and described, it will be understood that it is not intended to limit the inventions to the preferred embodiments, and it will be obvious to those skilled in the art that various changes and modifications may be made without departing from the spirit and scope of the inventions. Thus, the inventions are intended to cover alternatives, modifications, and equivalents, which may be included within the spirit and scope of the inventions as defined by the claims.

What is claimed is:

1. A method for detecting an edge within an image defined by a data set comprising a plurality of pixels, comprising:
   identifying a plurality of distinct classes based on textural differences between the plurality of distinct classes, wherein an interface on the image is defined between the plurality of distinct classes, and further wherein the edge on the image is defined by the interface;
   selecting a plurality of regions of the image, each region comprising a plurality of the pixels of the image;
   for each of the selected regions, applying an array of pattern recognition classifiers to the region using a processor, wherein each array comprises a plurality of pattern recognition classifiers and each pattern recognition classifier is configured and arranged to classify at least a portion of the region according to at least one of the plurality of distinct classes;
   identifying each region that exhibits a predetermined response pattern in the array of pattern recognition classifiers for that region indicating an increased likelihood that the region includes at least a portion of the edge, wherein the predetermined response pattern for each region comprises a predetermined pattern of classifications by the classifiers in the array for that region; and indicating the edge between the regions that exhibit the predetermined response pattern.

2. The method of claim 1, wherein the step of indicating the edge includes interpolating between the regions that exhibit the predetermined response pattern.

3. The method of claim 1, wherein the step of indicating the edge includes extrapolating at least a portion of the edge from at least one of the regions that exhibits the predetermined response pattern.

4. The method of claim 1, wherein each pattern recognition classifier yields a feature vector.

5. The method of claim 2, wherein interpolating the regions comprises drawing a smooth curve through the centers of the regions that exhibit the predetermined response pattern.

6. The method of claim 1, wherein applying the array of pattern recognition classifiers includes using a rectangular array of pattern recognition classifiers.

7. The method of claim 6, wherein each rectangular array comprises at least two pattern recognition classifiers.

8. The method of claim 6, wherein each rectangular array comprises at least two rows and two columns of pattern recognition classifiers.

9. The method of claim 1, wherein applying the array of pattern recognition classifiers includes using a circular array of pattern recognition classifiers.

10. The method of claim 1, wherein identifying each region includes identifying regions whose predetermined response pattern indicate that the number of pattern recognition classifiers lying on one side of the edge is approximately equal to the number of pattern recognition classifiers lying on the other side of the edge.

11. The method of claim 1, wherein identifying each region includes identifying regions whose predetermined response pattern indicate that the number of pattern recognition classifiers lying on or substantially close to the edge exceeds a threshold.

12. The method of claim 1, wherein identifying each region includes identifying regions in which a count of the number of pattern recognition classifiers lying on or substantially close to the edge exceeds a threshold.

13. The method of claim 8, wherein each rectangular array comprises at least four pattern recognition classifiers.

14. The method of claim 13, wherein each rectangular array comprises at least eight pattern recognition classifiers.

15. The method of claim 1, wherein each pattern recognition classifier applied to a region of the image returns a value identifying a class, from the plurality of distinct classes, of at least a portion of the region.

16. The method of claim 1, wherein each pattern recognition classifier utilizes a Bayesian classification technique for classification of a region.

* * * * *